July 21, 1942.  H. M. DODGE  2,290,678
PIVOTAL CONNECTION
Filed May 9, 1939

INVENTOR
HOWARD M. DODGE
BY
ATTORNEYS

Patented July 21, 1942

2,290,678

UNITED STATES PATENT OFFICE 2,290,678

PIVOTAL CONNECTION

Howard M. Dodge, Wabash, Ind., assignor to The General Tire & Rubber Company, Akron, Ohio, a corporation of Ohio Application May 9, 1939, Serial No. 272,624

17 Claims. (Cl. 287—85)

This invention relates to pivotal and resilient connections and more particularly to such connections between members which are separated or insulated from one another by resilient rubber cushions or bushings.

In suspending the frame of an automobile or other vehicle on the running gear it is customary to employ semi-elliptic or similar leaf springs, which are connected to chassis or frame by means of shackles. It has been proposed to bush the shackle connections between the springs and the chassis by means of rubber cushions which are effective in minimizing noise and vibration, and also in reducing the wear and making it unnecessary to lubricate the joint or connection with grease or oil. Also, in the steering mechanism and elsewhere of automotive vehicles and the like, pivotal connections of this character are employed, and manufacturers have resorted to rubber bushings or cushions to reduce the wear and vibration at these points. Obviously, the use of rubber bushings and cushions of this character make the vehicle less noisy in operation, so that in a general sense it may be said that the operating characteristics of the vehicle are improved. The forms of rubber bushings and cushions used have been varied to suit the particular requirements of the manufacturer.

A principal object of the invention is to provide an improved pivotal connection and rubber bushing therefor which is adapted for use in a wide variety of coupling connections, and which has improved operating characteristics. More specifically, the invention aims to provide a bushing of this character in which the inner end of the bushing is subjected to circumferential tension while, if desired, the outer end of the bushing may be subjected to axial compression.

Another object of the invention is to provide a pivotal connection having a rubber bushing which minimizes the wear between the parts and is of increased effectiveness in damping out vibrations between the parts so as to effect more quiet operation.

A further object is to provide a rubber bushing for a pivotal connection which is simple in design and construction, relatively inexpensive to manufacture, and which has increased wearing characteristics. Other objects and advantages will become apparent from the following detailed description of suitable embodiments of the invention made in connection with the accompanying drawing, in which.

Figure 1:
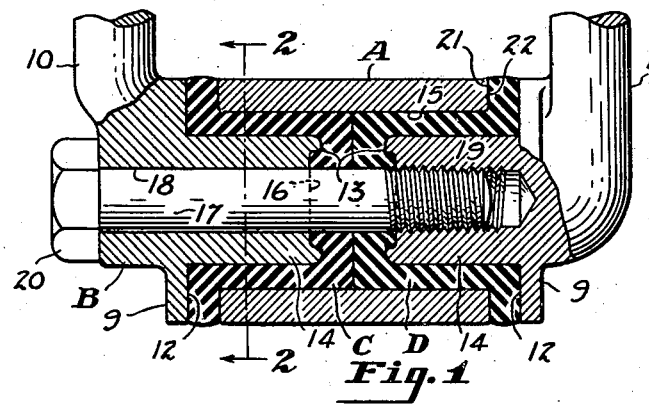
Figure 1 is a fragmentary detail partly in section and with parts broken away showing the connection of a shackle to one end of a leaf spring and employing my improved rubber cushions or bushings.
Figure 2:
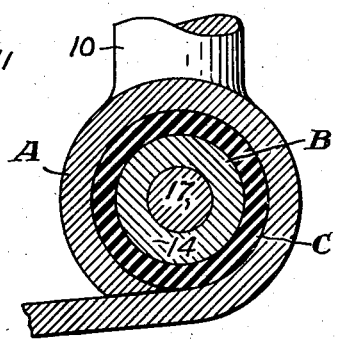
Fig. 2 is a sectional detail taken substantially on the line 2—2 of Fig. 1.

Referring to the drawing by numerals of reference, which indicate like parts throughout the several views, the invention will be first described in connection with the embodiment thereof illustrated in Figs. 1 through 4 wherein a spring eye A receives therethrough a pintle assembly B, and rubber cushions or bushings C and D embrace the pintle assembly to separate the same from the eye A. The spring eye A may be of conventional shape and the aperture therethrough which receives the pintle assembly is preferably cylindrical and of greater axial length than diameter. Each of the bushings C and D is formed of a suitable resilient rubber composition having approximately the stiffness or consistency commonly employed in the tread portions of pneumatic vehicle tires. The bushings may be formed by any conventional process, such for example as molding, and in their normal vulcanized form (Fig. 3) have a body portion 1 which is substantially frusto-conical in shape. An axial passage or aperture is formed through the center of the bushing and a portion 2 thereof within the body 1 has walls which are of substantially frustoconical shape. At the inner or small diameter end of the bushing, which end is normally disposed interiorly of the spring eye A, is formed a radially inwardly or centrally extending flange 3 which is preferably circumferential in extent. This flange has an inner circular or cylindrical wall 4 which forms the inner end portion of the passage through the bushing.

At the outer or large diameter end of the bushing is formed a radially extending, outwardly directed flange 5 which is preferably circumferential in extent, and has an inner cylindrical wall portion 6 which defines the outer end portion of the passage through the bushing. Between the outer flange 5 and the inner flange 3 the thickness of the frustoconical body 1 progressively increases, so that the thinnest section thereof is at 7 adjacent the flange 5, while the thickest portion thereof is at 8 adjacent the flange 3.

The pintle assembly B extends between spaced connecting members 10 and 11 which may comprise part of a conventional shackle construction. If desired, part of the pintle assembly, including end members 9, may be integral with the connecting members 10 and 11, as shown. The end members have substantially flat circular faces 12, which axially compress the rubber cushions as will later appear. The connecting members 10 and 11, or one of them, although stated to be portions of a spring shackle construction or spring bracket assembly well known in the art, may, if desired, be members of other types of pivotal connections. The invention is contemplated for use in a construction wherein a pivotal or oscillating type of movement of limited amplitude occurs between the pintle assembly B and the spring eye A.

Each of the circular faces 12 is of a diameter or dimension substantially equal to the outside diameter or dimension of the spring eye A, and the faces are directed toward one another and disposed in spaced parallel relation across the opposite ends of the spring eye. Extending from the central portions of the surfaces 12 are cylindrical thimbles 14 which are of less diameter than inside wall or surface 15 of the spring eye and are axially aligned with one another and extend into the spring eye from opposite ends thereof. These thimbles have recessed ends 16 to provide axially directed circular flanges 13, and the thimbles are of such length that their inner ends are spaced from one another within the eye. As shown in Fig. 1, the thimbles 14 may be integral with the respective end members 9 of the connecting members 10 and 11, and the parts may be secured together by an axially disposed pintle bolt 17 which extends through an axial hole 18 in the end 9 and the thimble 14 of the member 10. The threaded end of the bolt 17 is threadedly engaged in an axial socket 19 formed in the thimble 14 on the connecting member 11, and head 20 of the bolt seats against the outside of the end member 9 of the connecting member 10 so as to draw the ends 9 of the members 10 and 11 toward one another when tightened.

Figure 4:
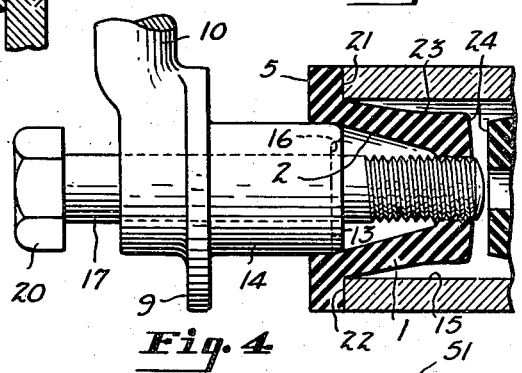
Fig. 4 is a view partly in section and with parts removed showing the structure of Fig. 1 in the process of assembly.

In assembling the pivotal connection the bushings C and D are placed with their inner or small diameter ends within the opposite ends of the spring eye A (see Fig. 4). In this position sides 21 of the outer flanges 5 of the bushings have circumferential seating engagement against opposite end walls 22 of the spring eye. The outer wall of the body 1 of each of the bushings is spaced from the inner wall 15 of the spring eye A throughout the major part of the length of the bushing body, as indicated at 23, Fig. 4. Each of the bushings C and D is shorter, axially, in its normal or unstressed shape than when in final position, so that, as shown in Fig. 4, when a pair of bushings is initially placed within the spring eye, and before the pintle assembly is drawn together, inner or small diameter ends 24 of the bushings are separated from one another.

Figure 3:
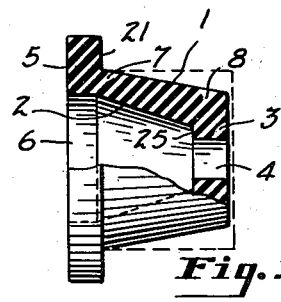
Fig. 3 is a detail partly in section showing one of my improved bushings in its normal shape.

The large diameter end of the bushing passage, defined by the wall portion 6, is of sufficient cross sectional area to accommodate the end of one of the thimbles 14 without material distension of the bushing. Upon drawing the ends 9 of the connecting members 10 and 11 together, such for example as by means of the bolt 17, the thimbles 14 engage the frustoconical walls 2 of the passages through the bushings to distend the body portions thereof. In Fig. 3 the full lines indicate a bushing in its normal and unstressed shape, while the broken lines show the approximate shape of the bushing when stressed and in place in the pivotal connection. This distension places the inner end portions of the rubber bushing bodies under circumferential tension, and also axially alongates the bushings, so that their inner ends 24 abut one another as shown in Fig. 1. During the assembly, the recessed ends 16 of the thimbles have circumferential seating engagement with inner walls 25 of the inner flanges 3 to assist in the axial elongation of the bushings, and the circular, axially directed flanges or rib members 13 bite into and deform the inner ends of the bushings to lock the bushings in proper position. The thimbles may also effect some axial compression of the inner flanges 3 during the final stages of tightening the assembly. Also, during the final tightening of the connection assembly the outer flanges 5 are axially compressed between end faces 22 of the spring eye and the circular faces 12 of the ends 9 of the connecting members 10 and 11. It is to be noted, however, that the outer flanges 5 of the bushings are substantially without circumferential elongation and that the circumferential distension of the bushings occurs almost wholly at the inner ends thereof. One effect of circumferential elongation of the walls of the frustoconical portions of the bushings, particularly adjacent the small diameter inner ends thereof where the greatest elongation occurs, is to reduce the thickness of such walls. Accordingly, the wall of each bushing, when in assembled or stressed condition, is of substantially uniform thickness from end to end. The degree of taper, or progressive increase in thickness of the walls of the body portion of the bushing from the flange 5 to the flange 3 is calculated, when designing the same, so that upon distension of the side walls by the insertion within the bushing of a substantialy cylindrical thimble, with the attendant axial elongation which occurs, the wall thickness becomes substantially uniform and the external surface of the bushing becomes substantially cylindrical.

Figure 5:
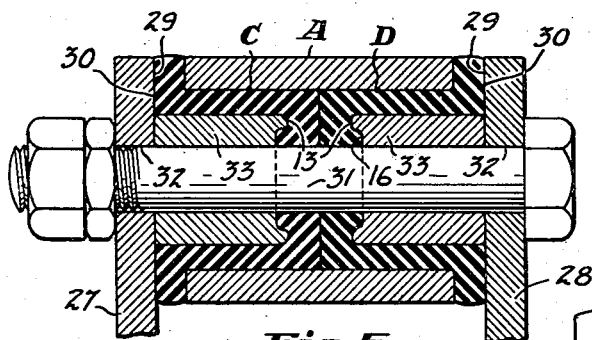
Fig. 5 is a fragmentary sectional view showing a modified form of pivotal connection embodying the present invention.

Fig. 5 shows a modified construction in which the connecting members 10 and 11 of the previous figures have been replaced by spaced, parallel side plates 27 and 28, which may be the regular side plates of an ordinary shackle construction, and have ends which present oppositely disposed flat faces 29 for circumferential seating engagement with opposite ends 30 of the bushings C and D. The ends of the side plates 27 and 28 are held and drawn together by a pintle bolt 31 which extends axially through the center of the spring eye A and through aligned, centrally disposed apertures 32 in the side plates. Cylinder thimbles 33 which are collectively of less length than the spring eye have axial bores and are slidingly received on the pintle bolt 31. These slidable thimbles are disposed in spaced apart relation on opposite ends of the bolt 31 and have ends which seat against the faces 29 of the side plates. The thimbles 33, although separate from the side plates, correspond to the integral thimbles 14 previously described and serve to distend and elongate the bushings C and D in the pivotal connection assembly. One advantage of the embodiment of the invention shown in Fig. 5 is that the assembly may be disconnected without withdrawing the thimbles 33 or bushings C and D.

While in the previously described embodiments of the invention each pivotal connection employed a pair of substantially identical cushions or bushings C and D which are cooperatively used and abut one another at the center of the device, it is also contemplated to form single piece bushings which may replace the pair of bushings C and D. Such a single piece bushing is shown in Fig. 6 and comprises a resilient rubber body having frusto-conical portions 35 and 36 each of which approximately corresponds in shape to the body portions 1 of the single bushings or cushions previously described.

The walls of the portions 35 and 36 of the bushing body progressively increase in thickness toward center 37 so that central wall portions 38 are materially thicker than end wall portions 39. Furthermore, when the bushing is in its normal or unstressed, the central part 37 of the body is of less diameter than the ends thereof. A radially outwardly directed flange 40 is formed on each end of the body and is circumferential in extent or substantially so. These flanges correspond to the outer end flanges 5 previously described.

A passage extends axially through the center of the bushing to receive the pintle, having at each end thereof a relatively short cylindrical portion 41 which lies radially inwardly of one of the end flanges 40. The pintle aperture also includes portions having frustoconical walls 42 within the portions 35 and 36 of the body. At the center 37 of the body an inwardly extending flange 43 is formed and has an inwardly directed cylindrical wall 44 which defines the central portion of the pintle passage through the bushing. The flange 43 in this embodiment of the invention performs the function of the flanges 3 of the bushings C and D previously described.

Figure 6:
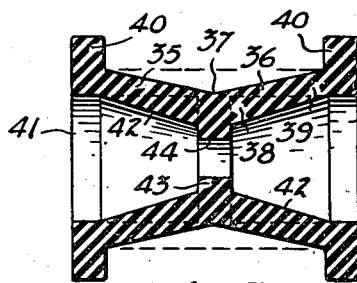
Fig. 6 is a view partly in section showing a modified type of bushing or cushion embodying the invention in its natural shape.

In assembling a so-called double bushing of the character shown in Figure 6 in a pivotal connection the bushing is axially elongated by stretching the body portions 35 and 36, particularly adjacent the center 37, and the bushing is also circumferentially distended adjacent the center so that while the annular flanges 40 are subjected only to axial compression by members of the pivotal connection which may correspond to the ends 9 of the connecting members 10 and 11, or faces 29 of the side plates 27 and 28, the central part of the double bushing is circumferentially distended and may also be axially elongated. The broken lines of Fig. 6 illustrate one form which the bushing, illustrated in its normal position by the solid lines, may take when assembled in a pivotal connection.

Figure 7:
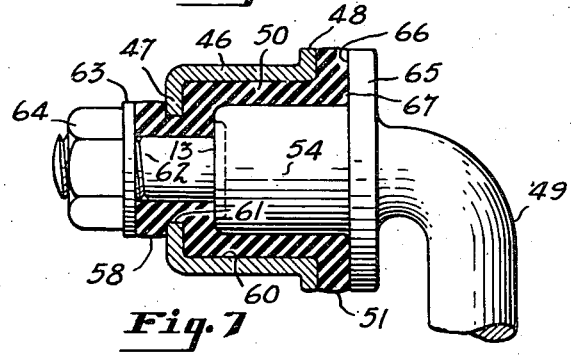
Fig. 7 is a fragmentary sectional view showing another pivotal connection embodying the connection.
Figure 8:
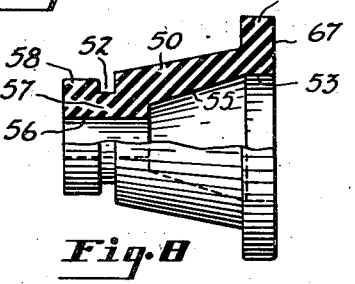
Fig. 8 is a view partly in section showing the bushing or cushion employed in the construction of Fig. 7 in its natural shape.

Figs. 7 and 8 illustrate an embodiment of the invention which may be used for various pivotal connections, such for example as in the steering mechanism of an automotive vehicle. A cylindrical metal sleeve 46 is provided with an annular inturned radially directed flange 47 at one end and an annular radially directed out-turned flange 48 at the opposite end, the two flanges preferably being substantially parallel to one another. This sleeve is adapted to be circumferentially embraced by a suitable split band or ring, not shown, so that upon tightening of the band or ring the sleeve is firmly held thereby. A connecting member 49, which is to have limited pivotal movement relative to the split ring or band, has a spindle which extends axially through the sleeve 46, being separated from the latter by a tubular rubber bushing shown in its normal shape or form in Fig. 8. This bushing has a frustoconical body portion 50, which corresponds to the body portion 1 of the bushing shown in Fig. 3, and at its outer or large diameter end the bushing has an outwardly directed radial flange 51 which corresponds to the flange 5 previously described.

Adjacent the small diameter end of the bushing is a circumferential groove 52 which receives the inwardly directed flange 47 of the sleeve 46 when the connection is assembled. The passage which receives the spindle of the connecting member 49 includes a relatively short cylindrical portion 53 defined by the inner circular wall of the flange 51 and which is of approximately the same diameter as large portion 54 of the spindle. The central portion of the axial passage through the bushing is defined by inner wall 55 of the body portion 50 of the bushing, which wall is substantially frustoconical in shape. At the small diameter end of the bushing is a passage or aperture portion having a substantially cylindrical wall 56 which is the inner side of a circular inwardly directed, radial flange 57 corresponding to the flange 3 previously described. The formation of the annular groove 52, in effect, provides a radially outwardly directed circular flange 58 on the small diameter end of the bushing.

In assembling the connection shown in Fig. 7, the bushing is placed within the socketlike sleeve 46, the outer wall of the body portion 50 of the bushing being initially spaced from inwardly facing cylindrical wall 60 of the sleeve similarly to the manner in which the bushing C is separated from the inner surface of the eye A, as previously described and illustrated in Fig. 4. The small diameter end of the bushing is then worked through opening 61, defined by the flange 47, so that the latter may seat in the groove 52. The spindle of the connecting member 49 is then inserted through the passage or aperture in the bushing so that small diameter end portion 62 of the spindle passes through the portion of the bushing aperture at the small diameter end of the bushing. During this movement the large diameter portion 54 of the spindle acts similarly to the thimbles 14 and 33, previously described, to circumferentially distend and axially elongate the small diameter end and thick sectioned portion of the bushing.

A metal washer 63 is received on the outer end of the small diameter portion 62 of the spindle and a nut 64 threaded on the spindle portion 62 retains the connection assembly together. In tightening the nut 64 the flange portion 58 of the rubber bushing is subjected to axial compression as also is the inwardly directed flange 57 on the small diameter end of the bushing.

A circular flange 65, on the connecting member 49 at one end of the spindle portion 54, is formed with a circular flat surface 66 which engages end 67 of the bushing to compress the outwardly directed flange 51 thereof against the flange 48 of the sleeve 46. Accordingly, both flanges on the small diameter end of the bushing and also the flange 51 on the large diameter end of the rubber bushing are subjected to axial compression in the assembled pivotal connection. While the flange 51 is substantially without circumferential distension or elongation, the flange 57 and also the body portion 50 of the bushing are circumferentially elongated.

In each of the embodiments of the invention shown in the drawing and described above the resilient rubber bushings are arranged to be confined between substantially concentric surfaces of members which are adapted to have limited pivotal or oscillatory movement relative to one another. The inner and outer surfaces of the bushings are held in frictional engagement with the relatively smooth and cylindrical surfaces of the pintle and socket, respectively. At the inner end or portion of each bushing the rubber is circumferentially tensioned around the pintle, so as to tightly embrace the same. A construction of this character is of increased effectiveness in resisting torsional stress applied to the connection. At the same time, the end flanges are maintained under axial compression, so that the connection is capable of withstanding axial thrusts of one member relative to the other. Although the frictional engagement between the surfaces of the bushings and the surfaces of the pintle assembly and socket resists torsional stress or twisting of one part of the connection relative to another, it is an important feature of the invention that if an exceptional torsional strain be applied, the rubber bushing may slip or slide relative to the pintle or socket, or both. In this fashion, injury to the pivotal connection or the parts thereof is avoided. Because of the difference in diameter of the pintle and socket, slippage would normally occur between the bushing and the pintle, if the pressure between the bushing and both parts of the connection engaged therewith were equal, or a greater pressure prevailed between the bushing and the socket.

If the bushing were forced over the pintle to distend the bushing, and thereby increase the pressure between the pintle and the bushing, slippage might then occur only between the bushing and the walls of the socket. In accordance with the present invention, however, one end or portion of the bushing is forced over the pintle, or a portion thereof, to distend such portion of the bushing and circumferentially tension the same to promote a tight gripping of the spindle, which the other end or another portion of the bushing is forced or pressed tightly against the walls or end portions of the socket. Hence, should such a torsional strain be imposed on the connection as cannot be wholly absorbed by radial distortion or twisting of the bushing, then slippage between the bushing and pintle occurs at one end or portion of the bushing while another end or portion of the bushing remains in nonslipping relation to the pintle. Similarly, one end or portion of the bushing may slip or slide relative to the wall or other portion of the socket, while another end or portion of the bushing remains in nonslipping relation to the socket member. Thus, torsional stress greater than can be absorbed by normal radial deformation or twisting of the bushing is absorbed or resisted by longitudinal twisting or deformation thereof. This action of the pivotal connections disclosed herein is extremely beneficial, particularly in applications such as in the automotive field.

The present invention is thus seen to provide a novel pivotal connection construction embodying a resilient rubber cushion which has a portion thereof subjected solely to axial compression, while another portion thereof is subjected to circumferential distension and axial elongation. Such an arrangement has been found to impart improved operating characteristics and has considerable resistance to wear. Additionally, pivotal connections constructed in accordance with the present invention may be quickly and easily assembled without special or expensive tools, and may be manufactured in quantity at a relatively low cost.

The principle of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. A pivotal connection between members having relative oscillating movement comprising a substantially cylindrical socket in one member, a pintle assembly extending into said socket and having a cylindrical portion substantially concentric with the socket wall, and a resilient rubber bushing disposed about the pintle in the socket, said bushing having a body portion of substantially uniform diameter and thickness from end to end within the socket and under circumferential tension and axial elongation, a radially inwardly directed circumferential flange integral with the body portion seated against one end of the cylindrical portion of the pintle assembly and under circumferential tension, and an integral flange on one end of the body portion remote from said inwardly directed flange, said last named flange being substantially without circumferential tension and under axial compression.

2. A pivotal connection comprising a member having a socket therein with a circular wall and open at one end, a pintle assembly extending axially through the socket, and a rubber cushion about the pintle in the socket, said cushion having a normal outside diameter at the innermost end thereof disposed within the socket which is materially less than the diameter of the socket at that point, and at the outermost end thereof which is substantially equal to the diameter of the socket at that point, the pintle assembly being arranged to distend the cushion into engagement with the socket wall throughout substantially the entire length of the cushion, an integral radially extending flange on the outer end of the cushion, and an integral radially extending flange on the inner end of the cushion, said inner flange being circumferentially elongated upon distension of the cushion.

3. A pivotal connection construction comprising spaced metal members and a resilient tubular rubber bushing between the members, said bushing having a body portion, one end of which is substantially without circumferential tension and the other end of which is under circumferential tension, and integral, radially directed, circumferentially extending flanges on the body, one of said flanges being circumferentially tensioned and another flange being axially compressed.

4. A rubber cushion to be interposed between members of a pivotal connection comprising a frustoconical body having therein a frustoconical recess and a cylindrical passage portion opening through the small diameter end of the body, and a circumferential groove around the end of the body having the cylindrical passage for interlocking with one of the connection members.

5. A pivotal connection comprising a member having a substantially cylindrical socket open at opposite ends and a radial flange at one end of the socket, a pintle assembly extending axially through the socket, a rubber cushion about the pintle in the socket, said cushion having a normal outside diameter at one end less than the corresponding diameter of the socket and at the other end substantially equal to the corresponding diameter of the socket, the pintle assembly being arranged to distend the cushion into engagement with the socket, and a groove around one end of the cushion to receive said radial flange and resist axial shifting of the socket member on the cushion.

6. A rubber cushion for a pivotal connection comprising a sleeve-like body having a radially directed flange on each end and a centrally disposed, radial flange extending in a direction opposite to that of one of the end flanges.

7. A rubber cushion for a pivotal connection comprising a sleeve-like body member having a passage therethrough to receive a pintle assembly, outwardly directed radial flanges on the ends of the body, and an inwardly directed radial flange in the central portion of the passage.

8. A pivotal connection for members having relative oscillating movement comprising means providing a substantially circular socket on one of the members, a pintle assembly on another of the members and disposed in said socket, and a resilient and deformable annular bushing embracing the pintle assembly within the socket, said bushing having a portion within the socket under circumferential tension throughout its entire radial thickness and provided with an integral radial flange, and an integral radial flange on the bushing under axial compression and disposed outside of the socket.

9. A pivotal connection for members having relative oscillating movement comprising means providing a substantially circular socket on one of the members, a pintle assembly on another of the members and including parts having different diameters disposed within the socket, and a resilient and deformable annular bushing embracing the pintle assembly within the socket, said bushing having an integral radial flange under circumferential tension and grippingly embracing a small diameter part of the pintle assembly, said flange being disposed against one end of a large diameter part of the pintle assembly.

10. In a pivotal connection, a resilient and deformable bushing which in its unstressed form has a tubular frusto-conical portion with integral radially extending flanges one at the large diameter end and one at the small diameter end of said tubular portion, and members for cooperatively engaging the bushing internally and externally to deform the same so that said tubular portion becomes substantially cylindrical and of approximately equal diameter from end to end and said small diameter end flange is circumferentially tensioned.

11. In a pivotal connection, an external member having a substantially cylindrical socket therein, a resilient and deformable tubular bushing receivable within the socket and having a body portion of less diameter than the socket and an outwardly directed integral flange on one end engageable with the external member to prevent the bushing being drawn completely into the socket, an internal member having one end receivable within the bushing and the external member and adapted to stretch the bushing into circumferential frictional engagement with the socket walls, and an integral inwardly directed flange on the bushing engageable with the end of the internal member to prevent said end from projecting through the bushing.

12. In a pivotal connection, an external member having a socket formed therein, a resilient and deformable bushing receivable in the socket and comprising a frusto-conical body having therein a frusto-conical recess substantially concentric to the outer surface of the body, the wall of said body being of progressively increasing thickness substantially from the large diameter end thereof substantially to the small diameter end thereof, and a radially directed circumferentially extending flange on each end of the body, and an internal member receivable within said recess and formed to engage the body of the bushing throughout substantially the entire length of the latter while the outside of the bushing body is circumferentially engaged by the external member throughout substantially the entire length of said body.

13. In a pivotal connection, an external member having a socket formed therein, a resilient and deformable bushing receivable in the socket and comprising a frusto-conical body having therein a frusto-conical recess substantially concentric to the outer surface of the body, and a radially directed circumferentially extending flange on each end of the body, and an internal member receivable within said recess and formed to engage the body of the bushing throughout substantially its entire length while the outside of the bushing body is circumferentially engaged by the external member throughout substantially the entire length of said body, one of said flanges being directed radially outwardly and disposed against an end of the external member and the other flange being directed radially inwardly and disposed against an end of the internal member to hold the bushing in predetermined axial position relative to said members.

14. A resilient and deformable tubular cushion for a pivotal connection, said cushion having a tapered body enclosing a tapered circular recess and with walls which increase in thickness progressively from the large end to the small end of the body, and circumferentially extending flanges formed on the ends of the body and integral therewith, the flange on the large diameter end of the body being directed radially outward only, to avoid restricting of the opening into the recess at the large diameter end of the body.

15. A resilient and deformable cushion to be interposed between members of a pivotal connection comprising a frusto-conical body having therein a frusto-conical recess, a radially directed circumferentially extending flange on each end of the body, each flange providing an annular abutment for one of the connection members, and a circumferential groove in the cushion for interlocking with one of the connection members, one wall of said groove providing an annular abutment for one of the connection members and facing in the same direction as and axially offset from the one of said first mentioned abutments which is at the same end of the body.

16. A resilient and deformable cushion to be interposed between members of a pivotal connection comprising a frusto-conical body having therein a frusto-conical recess, a radially inwardly directed circumferential flange on the small diameter end of the body, said flange providing an annular abutment for one of the connection members, and a circumferential groove around said end for interlocking with one of the connection members, one wall of said groove providing an annular abutment for one of the connection members and facing the same direction as and axially offset from said first mentioned abutment.

17. A rubber cushion for a pivotal connection comprising a tubular body of substantially circular cross section having an axial passage therethrough to receive a pintle assembly, said body being tapered from a relatively small diameter central portion thereof to relatively large diameter end portions thereof, and an integral radially directed flange on the body at the center thereof.

HOWARD M. DODGE.